United States Patent [19]

Hartman

[11] 4,063,003

[45] Dec. 13, 1977

[54] PRODUCT AND PROCESS FOR PRODUCING FIRE RETARDANT CELLULOSIC MATERIALS

[75] Inventor: Seymour Hartman, Mahopac, N.Y.

[73] Assignee: Champion International Corporation, Stamford, Conn.

[21] Appl. No.: 504,704

[22] Filed: Sept. 10, 1974

[51] Int. Cl.² .............................................. B32B 21/04
[52] U.S. Cl. ................. 428/537; 106/15 FP; 252/8.1; 427/394; 427/397; 427/415; 427/439; 427/440; 428/535; 428/921
[58] Field of Search ............... 427/394, 397, 439, 440; 106/15 FP, 123 LC; 252/8.1; 428/921, 535, 537; 260/233.5, 215

[56] References Cited

U.S. PATENT DOCUMENTS

| | | | |
|---|---|---|---|
| 1,734,291 | 11/1929 | Gebauer-Fuelnegg | 260/215 |
| 2,033,787 | 3/1936 | Rigby | 260/215 |
| 2,143,332 | 1/1939 | Sindl et al. | 260/215 |
| 2,559,914 | 7/1951 | Frank | 260/233.5 |
| 2,862,922 | 12/1958 | Sparrow et al. | 260/215 |
| 3,464,921 | 9/1969 | Erler et al. | 106/15 FP |
| 3,915,911 | 10/1975 | Horiguchi | 106/15 |

FOREIGN PATENT DOCUMENTS

| | | | |
|---|---|---|---|
| 1,194,018 | 6/1970 | United Kingdom | 428/921 |

*Primary Examiner*—Ronald H. Smith
*Assistant Examiner*—Sadie L. Childs
*Attorney, Agent, or Firm*—Evelyn M. Sommer

[57] ABSTRACT

A cellulosic substrate is rendered fire resistant through application thereto of an alcohol deactivated solution of chlorosulfonic acid and digested plant material.

12 Claims, No Drawings

PRODUCT AND PROCESS FOR PRODUCING FIRE RETARDANT CELLULOSIC MATERIALS

This invention relates to compositions for imparting fire resistance to and for fireproofing cellulosic materials, and further provides a simplified process for reducing the combustibility of normally combustible materials.

More particularly, the present invention is directed to fire resistant cellulosic materials and a process for their preparation including application of a treating agent, produced through alcoholic deactivation of a solution of chlorosulfonic acid digested plant material, to a cellulosic substrate.

This invention is of particular significance because of the high rate of utilization, particularly in the field of construction of cellulosic or wood materials. Simple and effective means for safeguarding the public against the danger of fires attendant to these combustible materials have long been sought. Therefore, the present process and products are of considerable importance insofar as they reduce the combustibility of cellulosic materials through application of the present treating agent.

The treating agent used in accordance with the present invention comprises an alcohol deactivated solution of chlorosulfonic acid digested plant material. Customarily, production of the present agent comprises a two-step process. Firstly, a plant material, commonly wood, is digested in chlorosulfonic acid. Incident to digestion, the cellulose, lignin, and other constituents of the plant material are solubilized in the acid. Thereafter, the solution containing plant material is treated with alcohol to decompose the remaining chlorosulfonic acid, thus yielding a treating solution which is deactivated with regard to its ability to digest cellulose.

During the first digestion step in the production of the treating agent, broad latitude is permitted in the selection of suitable proportions of plant material and chlorosulfonic acid. Obviously, however, when extremely low proportions of plant material are utilized, the resultant, intermediate solution will be dilute. Further, at the highest proportions of plant materials, complete digestion may not occur. The foregoing drawbacks are not unduly limitative of the scope of the present invention, however, inasmuch as where the treating agent is dilute, higher proportions thereof may be employed in obtaining adequate fire retardance, and where all the plant material is not digested, the resultant slurry may still be utilized in accordance with the present invention, although, it is preferred that the solution be decanted, or filtered, from its remaining solid constituents. It is preferred, however, that the plant material be present in an amount of from 1 to 20%, most preferably 4 to 12% by weight of chlorosulfonic acid. Suitable conditions of digestion may also be varied greatly. Although ambient temperatures are most convenient, higher or lower ones may be utilized.

In a preferred embodiment of the present invention, however, the cellulosic material is dried prior to exposure to the acid. Thus, for example, it may be exposed to a temperature of from about 50° to 150° C. for at least 15 minutes. Pursuant thereto, excess water is removed so as to minimize the degree to which it will decompose the chlorosulfonic acid digesting agent.

The second step of deactivation of the chlorosulfonic acid solution of digested cellulosic material is somewhat more critical. Essentially, this second step proceeds in accordance with the following reaction:

$$C_nH_{2n+1}OH + ClSO_2OH \rightarrow C_nH_{2n+1}O-SO_2OH + HCl$$

The criticality of this step resides in the elimination of chlorosulfonic acid from the eventual treating agent. Thus, an excess of alcohol for decomposing the chlorosulfonic acid is permissible although it will dilute the eventual treating agent. Care should be taken, however, to ensure essentially complete decomposition as otherwise, application of the treating agent to the eventual cellulosic substrate sought to be rendered fire retardant may result in some digestion thereof. Thus, it is preferred that the deactivating alcohol and chlorosulfonic acid remaining after digestion to reacted to inactivate the chlorosulfonic acid.

In performing this deactivation, essentially any alcohol may be utilized. Preferably, however, the alcohol is selected from the lower alkyl alcohols of from 1 to 4 carbons such as methanol, ethanol, isopropanol, etc. The deactivation itself proceeds readily under ambient conditions upon addition of the alcohol to the solution and, at least in the case of methanol, or isopropanol care should be taken to avoid unduly violent reaction incident to the decomposition of the chlorosulfonic acid. Thus, for example, the alcohol is usually added relatively slowly, with stirring, to the chlorosulfonic acid solution and the reaction mixture may even be cooled during addition.

Once the treating agent has been produced, its application to the cellulosic substrate may be performed by any of the means customary in the art. Thus, for example, the agent may be sprayed or painted onto the surface of the substrate to provide a fire retardent film thereon. Alternatively, the substrate may be submerged or dipped into a bath of the agent to impregnate and/or coat the substrate. Obviously too, the depth of impregnation and/or thickness of the coating film may easily be varied to provide greater or lesser degrees of fire retardancy, as desired.

Cellulosic substrates usefully treated in accordance with the present invention include any of the normally combustible cellulosic materials well known in commerce in the prior art. By the expression "cellulosic substrate" in the following specification, it is meant, any article which contains cellulose or a derivative thereof. Thus, for example, the term embraces hemicellulose and other essentially carbohydrate polymers containing glucose or glucose derivative units. Particularly, however, this term is inclusive of the woody materials commonly employed as structural members in the construction art; lumber, particleboard, cork, and other building materials are particularly useful in accordance with the present invention.

Upon contact between the present cellulosic substrate and treating agent, a darkened appearance is imparted to the substrate and it appears that some carbonization of the substrate surface occurs. Inasmuch as the alcoholically deactivated chlorosulfonic acid solution of plant material is itself dark in color, it is unknown whether the appearance imparted to the substrate actually evidences a chemical reaction between the treating agent and the substrate itself or is merely that of the treating agent. Whatever does occur, however, the fire retardance is produced.

In a further embodiment of the present invention the substrate and applied treating agent may be dried to facilitate handling of the final product. This step is easily accomplished by subjecting the composite to a short exposure to higher temperatures of the order of, for example, 50° to 150° C. and ensures adherence of the treating agent to the substrate.

Further embodiments within the scope of the invention include additional precautionary steps to avoid loss of the treating agent from the substrate. Thus, for example, a protective coating of a paint, or other covering materials as are known in the art may be applied to the surface of the substrate so as to ensure the permanency of the fire retardance. At the same time, such a protective step may have the additional advantage, particularly where it is in the form of a paint or other opaque coating, of covering the substrate and thereby rendering the appearance of the product article more acceptable.

The invention is further illustrated by the following examples.

EXAMPLE 1

60 grams of Douglas-Fir wood flakes are dried for 1 hour at 100° C. and then added to 85 grams of chlorosulfonic acid. This slurry is allowed to digest for 1 hour at 23° C. during which essentially all of the wood is dissolved. The solution is then filtered and 170 grams of isopropyl alcohol is added slowly to decompose the remaining chlorosulfonic acid, and to form a fire retardancy imparting treating solution.

Dry fir wood chips are then submerged in the treating solution for 2 minutes before being removed and dried at 100° C. for 15 minutes. Upon being inserted in the flame of a Bunsen burner, these treated chips exhibit only a slow smouldering of the wood in the flame area; no flame develops. After removal from the flame, only minor charring of the chip surface is observed. In contrast to the foregoing, however, untreated fir chips which were heated in the same manner burst into flame and continued to burn until they were converted to ash.

I claim:

1. A process for providing fire retardance to a cellulosic substrate comprising forming a solution by digesting plant material with chlorosulfonic acid, deactivating the resultant solution by decomposing the chlorosulfonic acid content thereof with alcohol and applying the deactivated solution to said substrate.

2. The process of claim 1 wherein the substrate to which the deactivated solution has been applied is dried.

3. The process of claim 2 wherein the deactivated solution is filtered prior to application to the substrate.

4. The process of claim 1 wherein the plant material is dried prior to digestion with chlorosulfonic acid.

5. The process of claim 1 wherein from about 1 to 20% plant material by weight of chlorosulfonic acid is digested.

6. The process of claim 1 wherein from 4 to 12% plant material by weight of chlorosulfonic acid is digested.

7. The process of claim 2 wherein after drying of the applied solution, the substrate is provided with a protective coating.

8. The process of claim 1 wherein the cellulosic substrate comprises wood.

9. The process of claim 1 wherein the plant material digested with chlorosulfonic acid comprises wood.

10. The product produced by the process of claim 1.

11. The product produced by the process of claim 2.

12. The product produced by the process of claim 7.

* * * * *